United States Patent
Hang

(10) Patent No.: US 9,698,690 B2
(45) Date of Patent: Jul. 4, 2017

(54) CONTROL METHOD AND CONTROL CIRCUIT FOR FOUR-SWITCH BUCK-BOOST CONVERTER

(71) Applicant: Silergy Semiconductor Technology (Hangzhou) LTD, Hangzhou, ZheJiang Province (CN)

(72) Inventor: Kailang Hang, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 236 days.

(21) Appl. No.: 14/561,066

(22) Filed: Dec. 4, 2014

(65) Prior Publication Data

US 2015/0162835 A1 Jun. 11, 2015

(30) Foreign Application Priority Data

Dec. 11, 2013 (CN) .......................... 2013 1 0676425

(51) Int. Cl.
*H02M 3/158* (2006.01)
*G05F 1/24* (2006.01)

(52) U.S. Cl.
CPC ................................ *H02M 3/1582* (2013.01)

(58) Field of Classification Search
CPC .... H02M 3/155–3/158; H02M 3/1582; H02M 3/1584; H02M 3/1588; H02M 3/33507
USPC .................. 323/259, 271, 282–286
See application file for complete search history.

(56) References Cited

U.S. PATENT DOCUMENTS

| | | | |
|---|---|---|---|
| 7,495,423 B1 * | 2/2009 | Knight | H02M 3/1582 323/259 |
| 8,067,925 B2 | 11/2011 | Grimm | |
| 8,710,905 B2 | 4/2014 | Chen | |
| 8,912,769 B2 * | 12/2014 | Lin | H02M 3/1582 323/224 |
| 2011/0043172 A1 * | 2/2011 | Dearn | H02M 3/1582 323/259 |
| 2013/0313974 A1 | 11/2013 | Fan et al. | |
| 2013/0321076 A1 * | 12/2013 | Galbis | H03F 1/0216 330/127 |
| 2014/0198540 A1 | 7/2014 | Xu | |

(Continued)

FOREIGN PATENT DOCUMENTS

CN 102055335 A 5/2011

*Primary Examiner* — Gary L Laxton
*Assistant Examiner* — Kevin H Sprenger
(74) *Attorney, Agent, or Firm* — Michael C. Stephens, Jr.

(57) ABSTRACT

In one embodiment, a method of controlling a converter can include: (i) when first and fourth switches are on, and second and third switches are off, generating an on time signal according to an input voltage and a stable output voltage of the converter; (ii) generating an off time signal according to the input voltage and the stable output voltage of the converter; (iii) generating a reference time voltage according to a reference current signal and a reference voltage signal; and (iv) controlling the first, second, third, and fourth switches based on whether the on time signal is activated to indicate that the converter is operating in a buck mode, the off time signal is activated to indicate that the converter is operating in a boost mode, or the reference time signal is activated to indicate that the converter is operating in a buck-boost mode.

6 Claims, 16 Drawing Sheets

(56) References Cited

U.S. PATENT DOCUMENTS

2014/0218001 A1* 8/2014 Dally .................. G05F 1/618
323/285

* cited by examiner

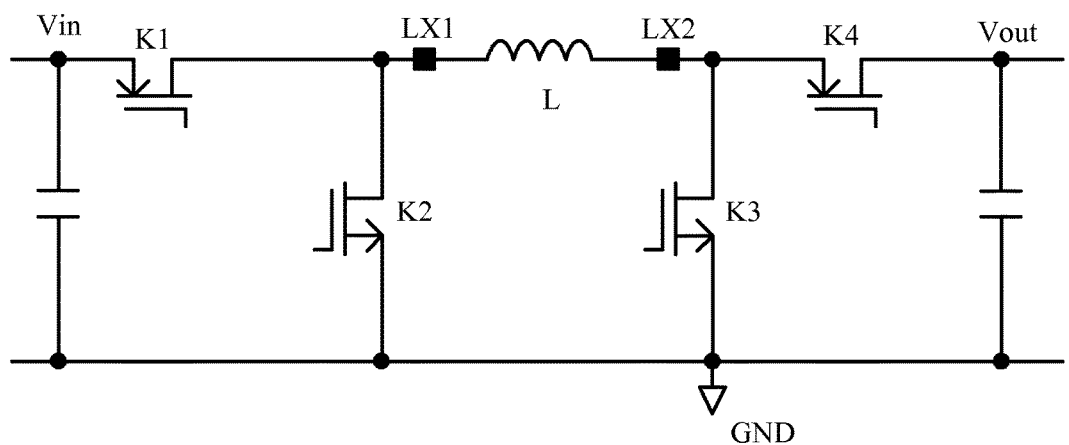
FIG. 1
(conventional)

CONTROL METHOD AND CONTROL CIRCUIT FOR FOUR-SWITCH BUCK-BOOST CONVERTER

RELATED APPLICATIONS

This application claims the benefit of Chinese Patent Application No. 201310676425.X, filed on Dec. 11, 2013, which is incorporated herein by reference in its entirety.

FIELD OF THE INVENTION

The present invention relates to the field of power electronics, and more particularly to control methods and circuits for a four-switch buck-boost converter.

BACKGROUND

Switch mode power supplies can efficiently convert electrical power from a source to a load, or to several different loads, with each corresponding to a different output. The main transistor of a switching-mode supply can switch between on and off states at a given operating frequency, and voltage regulation can be achieved by varying the ratio of the on-to-off time of the main transistor. Switch mode power supplies may have relatively high power conversion efficiency, as compared to other types of power converters. Switch mode power supplies may also be substantially smaller and lighter than a linear supply due to the smaller transformer size and weight.

SUMMARY

In one embodiment, a method of controlling a converter having an inductor and first, second, third, and fourth switches, can include: (i) when the first and fourth switches are on, and the second and third switches are off, generating an on time signal according to an input voltage and a stable output voltage of the converter, where the first switch is coupled between the input voltage and a first terminal of the inductor, the second switch is coupled between the first terminal of the inductor and ground, the third switch is coupled between a second terminal of the inductor and ground, and the fourth switch is coupled between the second terminal of the inductor and the stable output voltage; (ii) generating an off time signal according to the input voltage and the stable output voltage of the converter; (iii) generating a reference time voltage according to a reference current signal and a reference voltage signal; (iv) turning off the first switch and turning on the second switch when the on time signal is activated to indicate that the converter is operating in a buck mode, where the first switch is turned on and the second switch is turned off when an inductor current reaches a predetermined valley value; (v) turning on the third switch and turning off the fourth switch when the off time signal is activated to indicate that the converter is operating in a boost mode, where the third switch is turned off and the fourth switch is turned on when the inductor current reaches a predetermined peak value; and (vi) turning off the first switch and turning on the second switch when the reference time signal is activated to indicate that the converter is operating in a buck-boost mode, where the first and third switches are turned on and the second and fourth switches are turned off when the inductor current reaches the predetermined valley value, and where the third switch is turned off and the fourth switch is turned on when the inductor current reaches the predetermined peak value.

In one embodiment, control circuit configured to control a converter having an inductor and first, second, third, and fourth switches, can include: (i) a buck mode detection circuit configured to generate an on time signal according to an input voltage and a stable output voltage of the converter when the first and fourth switches are on, and the second and third switches are off, where the first switch is coupled between the input voltage and a first terminal of the inductor, the second switch is coupled between the first terminal of the inductor and ground, the third switch is coupled between a second terminal of the inductor and ground, and the fourth switch is coupled between the second terminal of the inductor and the stable output voltage; (ii) a boost mode detection circuit configured to generate an off time signal according to the input voltage and the stable output voltage of the converter; (iii) a buck-boost mode detection circuit configured to generate a reference time voltage according to a reference current signal and a reference voltage signal; (iv) a main control circuit configured to turn off the first switch and turn on the second switch when the on time signal is activated to indicate that the converter is operating in a buck mode, where the first switch is turned on and the second switch is turned off when an inductor current reaches a predetermined valley value; (v) the main control circuit being configured to turn on the third switch and to turn off the fourth switch when the off time signal is activated to indicate that the converter is operating in a boost mode, where the third switch is turned off and the fourth switch is turned on when the inductor current reaches a predetermined peak value; and (vi) the main control circuit being configured to turn off the first switch and to turn on the second switch when the reference time signal is activated to indicate that the converter is operating in a buck-boost mode, where the first and third switches are turned on and the second and fourth switches are turned off when the inductor current reaches the predetermined valley value, and where the third switch is turned off and the fourth switch is turned on when the inductor current reaches the predetermined peak value.

BRIEF DESCRIPTION OF THE DRAWINGS

FIG. 1 is a schematic block diagram of an example power stage circuit of a four-switch buck-boost converter.

DETAILED DESCRIPTION

Figure 2:
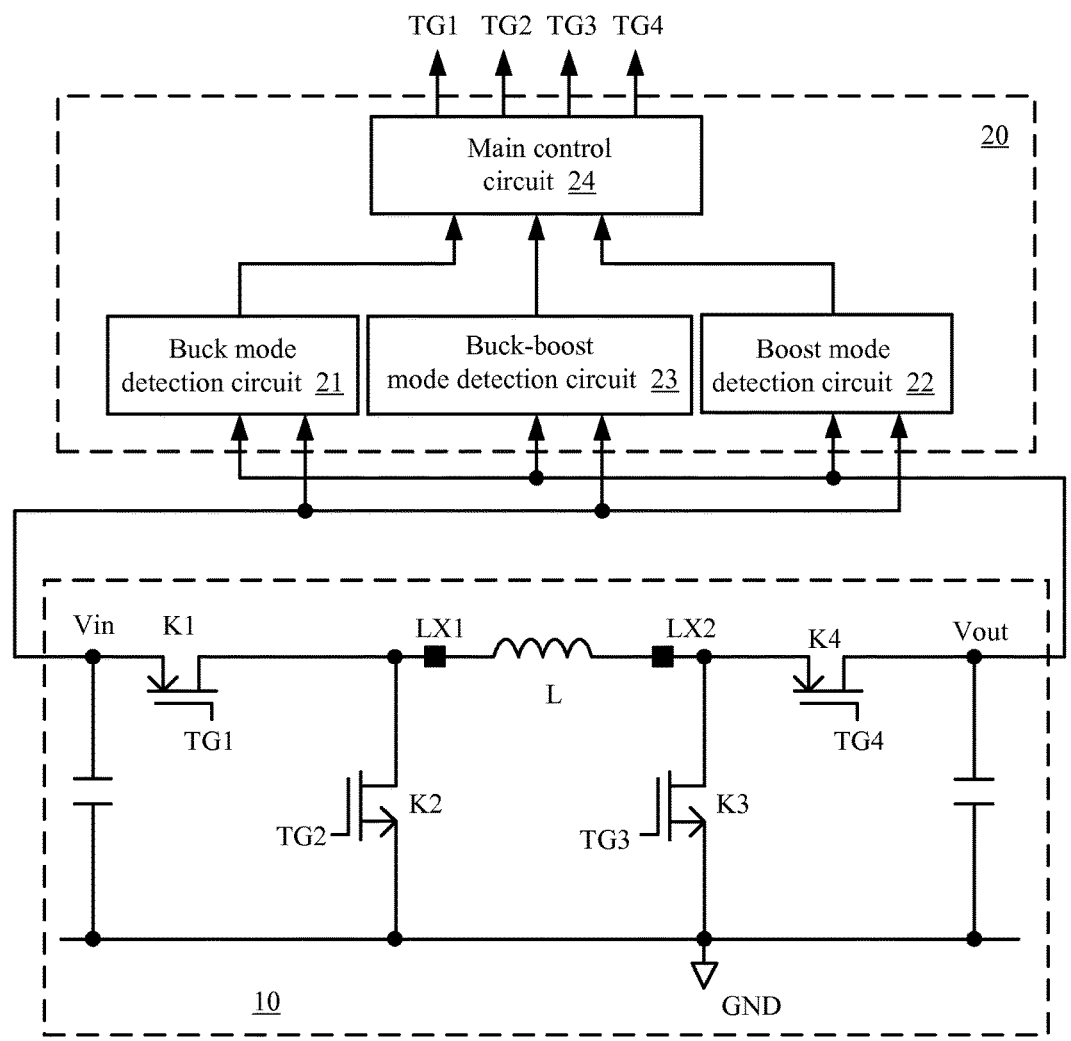
FIG. 2 is a schematic block diagram of an example control circuit for a four-switch buck-boost converter, in accordance with embodiments of the present invention.

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Referring now to FIG. 1, shown is a schematic block diagram of an example power stage circuit of a four-switch buck-boost converter. Four-switch buck-boost converters are widely used in fields like electrical power, communications, various electronic instruments, etc., and may include advantages of relatively high stability and efficiency, as well as an adjustable output voltage. Generally, a power stage circuit of a four-switch buck-boost converter can include switches (e.g., transistors) K1, K2, K3 and K4, and inductor L. For example, switch K1, inductor L, and switch K4 can be coupled in series between input and output terminals of the converter. Also, switch K2 can connect to common node/terminal LX1 of switch K1 and inductor L, and also to ground. Switch K3 can connect to common node/terminal LX2 of switch K4 and inductor L, and also to ground.

This particular example four-switch buck-boost converter can include three operation modes. For example, when input voltage Vin (e.g., a battery voltage) is much greater than output voltage Vout (e.g., for the load), the power stage circuit can operate in a buck mode. In this case, switch K4 can remain on, switch K3 can remain off, and switches K1 and K2 can alternately be turned on and off. When input voltage Vin is much less than output voltage Vout, the power stage circuit can operate in a boost mode. In this case, switch K1 can remain on, switch K2 can remain off, and switches K3 and K4 can alternately be turned on and off.

When input voltage Vin is relatively close to output voltage Vout, the power stage circuit can operate in a buck-boost mode, and switches K1 through K4 can alternately be turned on and off. In this case, the operation period of the converter can be divided into three stages. In a first stage, switches K1 and K3 may be on. In a second stage, switches K1 and K4 may be on. Also, in a third stage, switches K2 and K4 may be on. A control circuit of the four-switch buck-boost converter can control the converter to operate in the different modes by comparing input voltage Vin against output voltage Vout. However, switching from one mode to another mode may result in significant variation of the inductor current, a relatively large number of components, a relatively high product cost, a relatively complicated control process, as well as a relatively low conversion efficiency.

In particular embodiments, switches K1 and K4 of the four-switch buck-boost converter may both be turned on regardless of whether the converter operates in a buck mode, a boost mode, or a buck-boost mode. Thus, the operation mode (e.g., buck mode, boost mode, buck-boost mode, etc.) can be determined during a time period or duration when switches K1 and K4 are on. In this way, substantially seamless switching between different operation modes can be realized.

In one embodiment, control circuit configured to control a converter having an inductor and first, second, third, and fourth switches, can include: (i) a buck mode detection circuit configured to generate an on time signal according to an input voltage and a stable output voltage of the converter when the first and fourth switches are on, and the second and third switches are off, where the first switch is coupled between the input voltage and a first terminal of the inductor, the second switch is coupled between the first terminal of the inductor and ground, the third switch is coupled between a second terminal of the inductor and ground, and the fourth switch is coupled between the second terminal of the inductor and the stable output voltage; (ii) a boost mode detection circuit configured to generate an off time signal according to the input voltage and the stable output voltage of the converter; (iii) a buck-boost mode detection circuit configured to generate a reference time voltage according to a reference current signal and a reference voltage signal; (iv) a main control circuit configured to turn off the first switch and turn on the second switch when the on time signal is activated to indicate that the converter is operating in a buck mode, where the first switch is turned on and the second switch is turned off when an inductor current reaches a predetermined valley value; (v) the main control circuit being configured to turn on the third switch and to turn off the fourth switch when the off time signal is activated to indicate that the converter is operating in a boost mode, where the third switch is turned off and the fourth switch is turned on when the inductor current reaches a predetermined peak value; and (vi) the main control circuit being configured to turn off the first switch and to turn on the second switch when the reference time signal is activated to indicate that the converter is operating in a buck-boost mode, where the first and third switches are turned on and the second and fourth switches are turned off when the inductor current reaches the predetermined valley value, and where the third switch is turned off and the fourth switch is turned on when the inductor current reaches the predetermined peak value.

Referring now to FIG. 2, shown is a schematic block diagram of an example control circuit for a four-switch buck-boost converter, in accordance with embodiments of the present invention. Control circuit 20 in this example can control four-switch buck-boost converter 10 to generate relatively stable output voltage Vout. Four-switch buck-boost converter 10 can include inductor L, switch K1 that can connect between input voltage Vin and terminal LX1 of inductor L, switch K2 that can connect between terminal LX1 of inductor L and ground GND, switch K3 that can connect between terminal LX2 of inductor L and ground GND, switch K4 that can connect between terminal LX2 of inductor L and stable output voltage Vout, and a load (e.g., a light-emitting diode [LED]) that can connect between output voltage Vout and ground GND.

Four-switch buck-boost converter 10 can convert input voltage Vin (e.g., a battery voltage) to stable output voltage Vout for the load. Converter 10 can provide output voltage Vout that is higher or lower than input voltage Vin, or may be equal to input voltage Vin. In this particular example, control circuit 20 can control four-switch buck-boost converter 10 to operate in a buck mode (mode 1), a boost mode (mode 4), or a buck-boost mode (modes 2 and 3). In mode 1, output voltage Vout generated by four-switch buck-boost converter 10 can be lower than input voltage Vin. In mode 4, output voltage Vout generated by four-switch buck-boost converter 10 can be higher than input voltage Vin. In modes 2 or 3, output voltage Vout generated by four-switch buck-boost converter 10 may be higher or lower than input voltage Vin, or may be equal to input voltage Vin.

Figure 3:
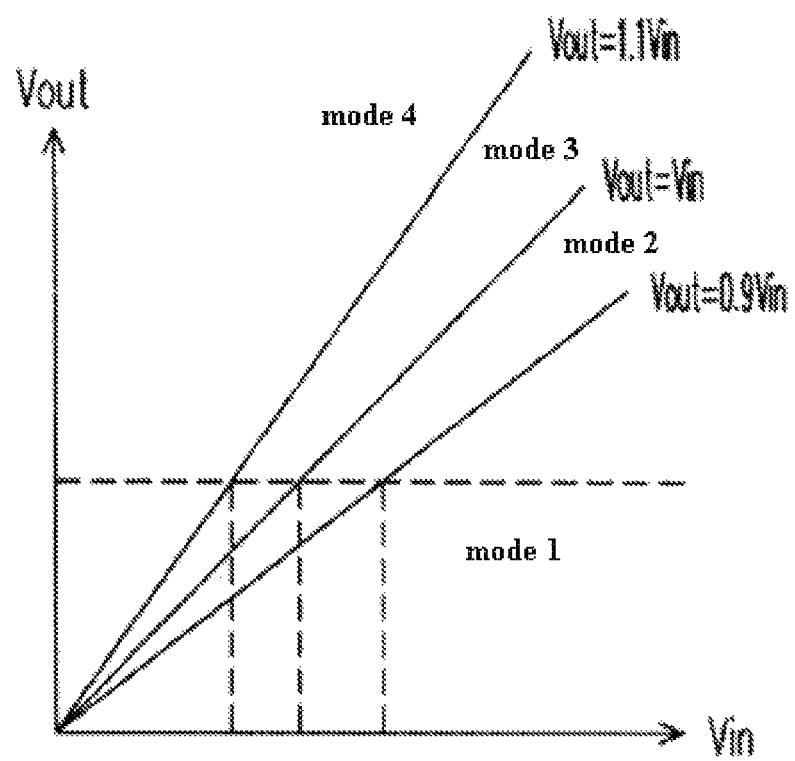
FIG. 3 is a diagram of example definitions of modes 1 to 4, in accordance with embodiments of the present invention.

Referring now to FIG. 3, shown is a diagram of example definitions of modes 1 to 4, in accordance with embodiments of the present invention. For example, when Vout is less than or equal to ratio Ka (e.g., 90%) of Vin, i.e., Vin×Ka≥Vout, four-switch buck-boost converter 10 may operate in mode 1. Also for example, when Vout is higher than ratio Ka (e.g., 90%) of Vin, but less than Vin, i.e., Vin×Ka<Vout<Vin, four-switch buck-boost converter 10 can operate in mode 2. Also for example, when Vout is higher than Vin but lower than ratio Kb (e.g., 110%) of Vin, i.e., Vin<Vout<Vin×Kb, four-switch buck-boost converter 10 can operate in mode 3. Also for example, when Vout is higher than or equal to ratio Kb of Vin, i.e., Vin×Kb≤Vout, four-switch buck-boost converter 10 can operate in mode 4. The ratios may be set or predetermined according to overall circuit response. For example, ratio Ka may be set as 0.9, and ratio Kb may be set as 1.1; however, other predetermined ratio values may also be supported in particular embodiments.

Referring again to FIG. 2, control circuit 20 can include buck mode detection circuit 21, boost mode detection circuit 22, and buck-boost mode detection circuit 23, in order to detect a present operation mode of four-switch buck-boost converter 10. Buck mode detection circuit 21, boost mode detection circuit 22, and buck-boost mode detection circuit 23 can be coupled to input voltage Vin and output voltage Vout of four-switch buck-boost converter 10 for detecting the operation mode thereof in real-time, and for providing the detected results to main control circuit 24. Main control circuit 24 can generate operating signals TG1, TG2, TG3, and TG4 according to the detected results of buck mode detection circuit 21, boost mode detection circuit 22, and buck-boost mode detection circuit 23, in order to control on/off states of switches (e.g., transistors) K1, K2, K3, and K4.

When switches K1 and K4 are on, and switches K2 and K3 are off, the mode detection circuits (e.g., buck mode detection circuit 21, boost mode detection circuit 22, and buck-boost mode detection circuit 23) can operate at a substantially same time. Buck mode detection circuit 21 can generate on time signal Ton according to input voltage Vin and stable output voltage Vout of converter 10. Boost mode detection circuit 22 can generate off time signal Toff according to input voltage Vin and stable output voltage Vout of converter 10 at substantially the same time. Also, buck-boost mode detection circuit 23 can generate reference time signal Tref according to reference current signal Iref and reference voltage signal Vref.

Main control circuit 24 can control on and off states of switches K1, K2, K3, and switch K4 according to on time signal Ton, off time signal Toff, and reference time signal Tref. When on time signal Ton is activated (e.g., transitions high), the converter can operate in a buck mode (mode 1), which can turn off switch K1 and turn on switch K2. When off time signal Toff is activated (e.g., transitions high), the converter may operate in a boost mode (mode 4), and can turn off switch K4 and turn on switch K3. When reference time signal Tref is activated (e.g., transitions high), the converter may operate in a buck-boost mode (mode 2 or mode 3), and thereafter on time signal Ton or off time signal Toff can be activated (e.g., transitions high), and can turn off switch K1 and turn on switch K2.

Main control circuit 24 can control on/off states of switches K1, K2, K3, and switch K4 according to the present operation mode of the converter. When the converter operates in a buck mode, and an inductor current is detected to reach a level of a predetermined valley or local minimum value, switch K2 can be turned off and switch K1 can be turned on. When the converter operates in a boost mode, and the inductor current is detected to reach a level of a predetermined peak or local maximum value, switch K3 can be turned off and switch K4 can be turned on. When the converter operates in a buck-boost mode, and the inductor current is detected to reach a level of the predetermined valley value, switch K2 can be turned off and switch K1 can be turned on, and switch K4 can be turned off and switch K3 can be turned on substantially simultaneously. When the inductor current is detected to reach the predetermined peak value, switch K3 can be turned off and switch K4 can be turned on. Also, the above steps can be repeated in order to regulate the stable output voltage.

Figure 4:
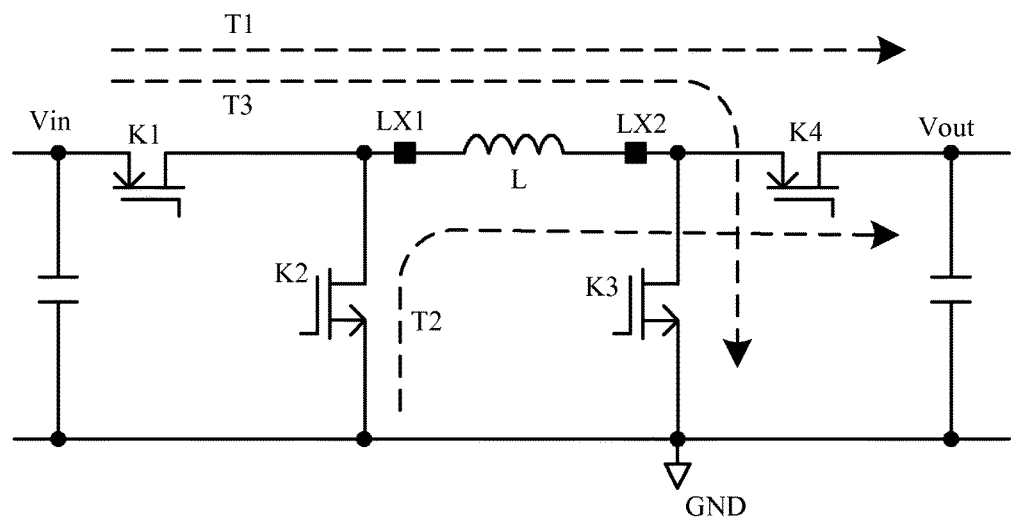
FIG. 4 is a topology diagram of an example operating path of the four-switch buck-boost converter of FIG. 2, in accordance with embodiments of the present invention.

Referring now to FIG. 4, shown is a topology diagram of an example operating path of the four-switch buck-boost converter of FIG. 2, in accordance with embodiments of the present invention. When four-switch buck-boost converter 10 operates in a buck mode (mode 1), the switches can be turned on with orders as K1K4→K2K4→K1K4→K2K4→ . . . (e.g., T1→T2). When four-switch buck-boost converter 10 operates in boost mode (mode 4), the switches can be turned on with orders as K1K4→K1K3→K1K4→K1K3→ . . . (e.g., T1→T3). When four-switch buck-boost converter 10 operates in a buck-boost mode (modes 2 or 3), the switches can be turned on with orders as K1K4→K2K4→K1K3→K1K4→K2K4→K1K3→ . . . (e.g., T1→T2→T3).

An example logic relationship of the various operation modes in particular embodiments can be shown below as Table 1:

| Buck-boost | Buck | Boost | Operation mode | Path |
|---|---|---|---|---|
| 0 | 1 | 0 | pure buck (mode 1) | T1→T2 |
|  | 0 | 1 | pure boost (mode 4) | T1→T3 |
| 1 | 1 | 0 | buck-boost (mode 2) | T1→T2→T3 |
|  | 0 | 1 | buck-boost (mode 3) | T1→T2→T3 |

Figure 5:
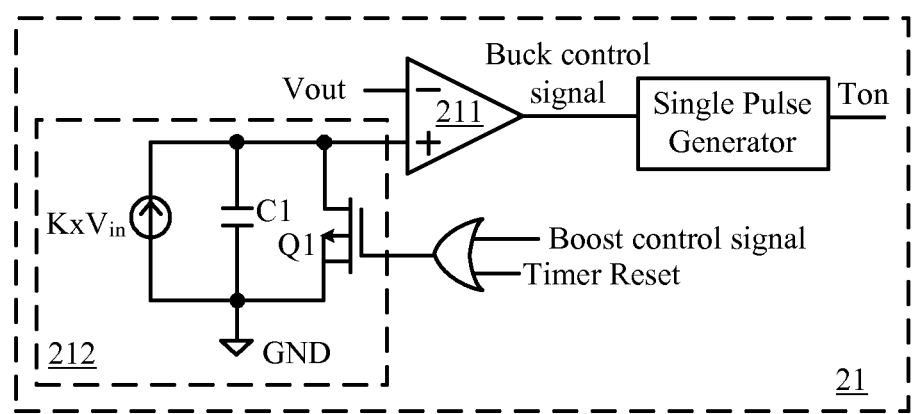
FIG. 5 is a schematic block diagram of an example buck mode detection circuit of the control circuit of FIG. 2, in accordance with embodiments of the present invention.

FIGS. 5-8 show various example circuit structures of buck mode detection circuit 21, boost mode detection circuit 22, buck-boost mode detection circuit 23, and main control circuit 24. Referring now to FIG. 5, shown is a schematic block diagram of an example buck mode detection circuit of the control circuit of FIG. 2, in accordance with embodiments of the present invention. Buck mode detection circuit 21 can include comparator 211 and charging-discharging circuit 212. Charging-discharging circuit 212 can include charging capacitor C1 with capacitance C, and a voltage controlled current source for generating a current signal in proportion to input voltage Vin as a charging current. Charging-discharging circuit 212 can discharge charging capacitor C1 through switch Q1.

For example, switch Q1 can be controlled by a signal obtained by a logical-OR operation on a boost control signal and a timing reset signal ("Timer Reset"). Comparator 211 may have an inverting input terminal for receiving stable output voltage Vout, a non-inverting input terminal for receiving a voltage across charging capacitor C1, and an output terminal for providing a buck control signal. On time signal Ton can be generated by processing the buck control signal via a single pulse generator, and on time signal Ton may be provided to main control circuit 24. For example, when the voltage across charging capacitor C1 reaches a level of output voltage Vout, i.e., $$\frac{V_{in} \times K}{C} \times T_{on} = V_{out},$$

on time signal Ton can go high, where Vin is the input voltage, Vin×K (K is a predetermined ratio) is a current signal in proportion to input voltage Vin, Vout is the stable output voltage, and Ton is the on time of switch K1.

Figure 6:
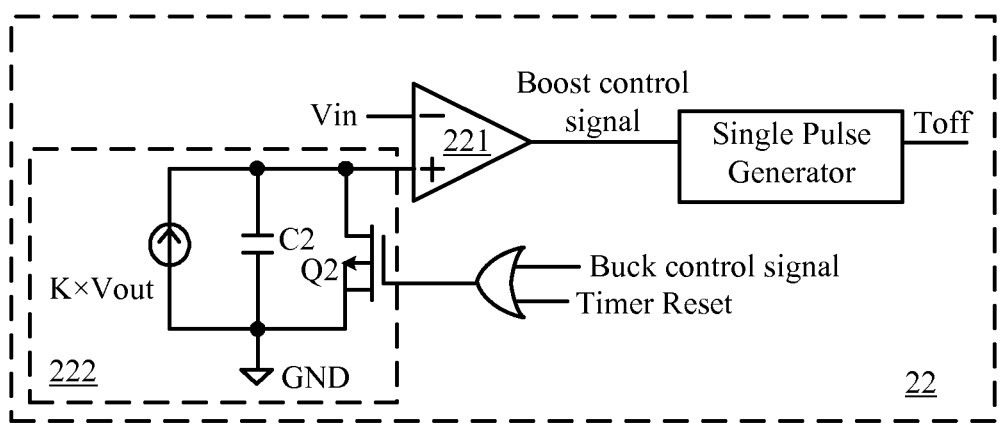
FIG. 6 is a schematic block diagram of an example boost mode detection circuit of the control circuit of FIG. 2, in accordance with embodiments of the present invention.

Referring now to FIG. 6, shown is a schematic block diagram of an example boost mode detection circuit of the control circuit of FIG. 2, in accordance with embodiments of the present invention. Boost mode detection circuit 22 can include comparator 221 and charging-discharging circuit 222. Charging-discharging circuit 222 can include charging capacitor C2 with the capacitance C as charging capacitor C1, and a voltage controlled current source for generating a current signal in proportion to output voltage Vout as a charging current. Charging-discharging circuit 222 can discharge charging capacitor C2 through switch Q2, which can be controlled by a signal obtained by a logical-OR operation on a buck control signal and a timing reset signal.

Comparator 221 may have an inverting input terminal for receiving input voltage Vin, a non-inverting input terminal for receiving a voltage across charging capacitor C2, and an output terminal for providing a boost control signal. Off time signal Toff can be generated by processing the boost control signal via a single pulse generator, and may be provided to main control circuit 24. For example, when the voltage across charging capacitor C2 reaches input voltage Vin, i.e., $$\frac{V_{out} \times K}{C} \times T_{off} = V_{in},$$

off time signal Toff can go high, where Vin is the input voltage, Vout is the stable output voltage, Vout×K is a current signal in proportion to stable output voltage Vout, and Toff is the off time of switch K3.

Figure 7:
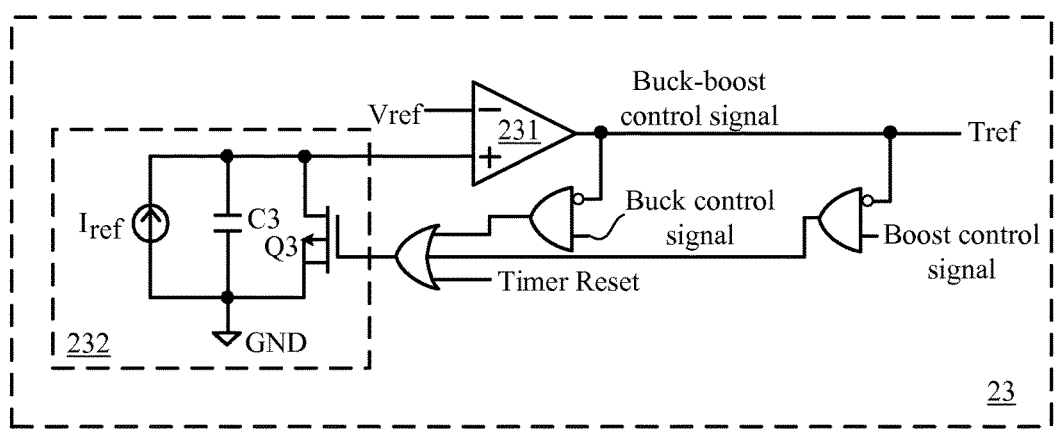
FIG. 7 is a schematic block diagram of an example buck-boost mode detection circuit of the control circuit of FIG. 2, in accordance with embodiments of the present invention.

Referring now to FIG. 7, shown is a schematic block diagram of an example buck-boost mode detection circuit of the control circuit of FIG. 2, in accordance with embodiments of the present invention. Buck-boost mode detection circuit 23 can include comparator 231 and charging-discharging circuit 232. Charging-discharging circuit 232 can include charging capacitor C3 with capacitance C as charging capacitor C1, and a current source for generating charging current Iref. Charging-discharging circuit 232 can discharge charging capacitor C3 through switch Q3. Switch Q3 can be controlled by a signal obtained by performing a logical-AND operation on the buck control signal and an inverted version of the buck-boost control signal, a signal obtained by performing a logical-AND operation on the boost control signal and an inverted version of the buck-boost control signal, and a timing reset signal via a logical-OR operation, as shown. Comparator 231 may have an inverting input terminal for receiving reference voltage signal Vref, a non-inverting input terminal for receiving a voltage across charging capacitor C3, and an output terminal for providing the buck-boost control signal as reference time signal Tref to main control circuit 24.

For example, when the voltage across charging capacitor C3 reaches reference a level of voltage signal Vref, i.e., $$\frac{I_{ref}}{C} \times T_{ref} = V_{ref},$$

reference time signal Tref may go high, where Vin is the input voltage, Iref is the reference current signal, Vref is reference voltage signal, and Tref is the reference time. Also, reference current signal Iref and reference voltage signal Vref may be determined according to an operation period of converter 10. For example, in order to guarantee that the reference time is less than the operation period of the converter, the reference time can be about 80% of the operation period. Also, timing reset signal Timer Reset can be generated through a timing reset device or circuit, and when switches K1 and K4 of converter 10 are both on, the timing reset signal can be activated.

Figure 8:
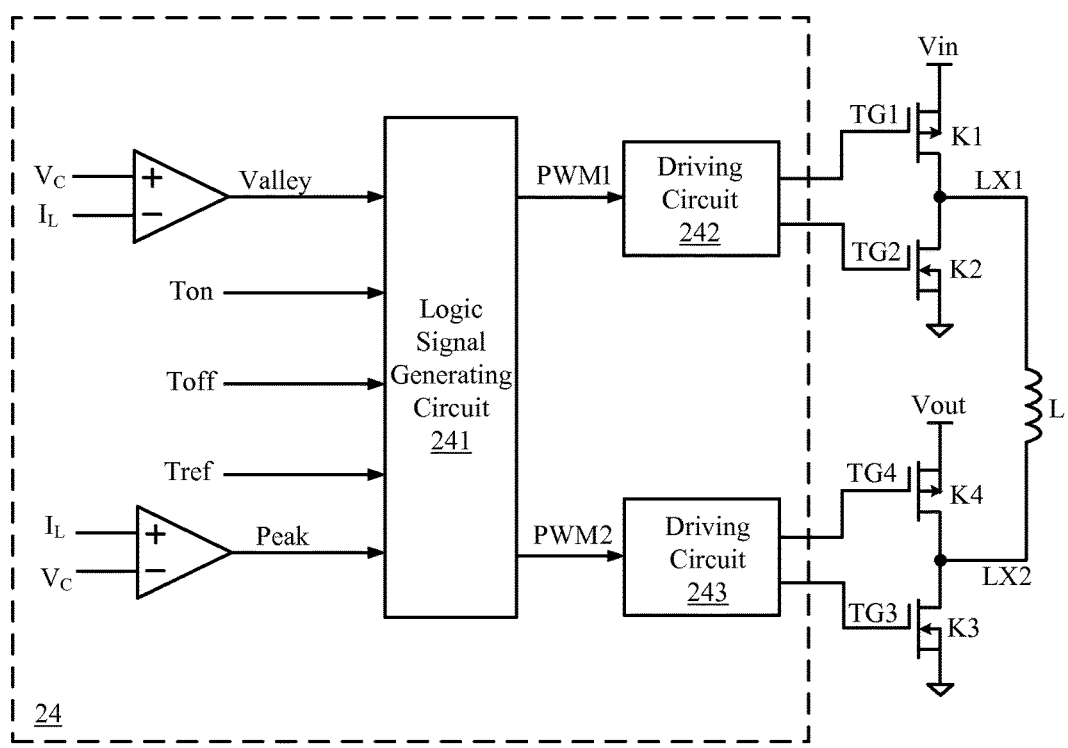
FIG. 8 is a schematic block diagram of an example main control circuit of the control circuit of FIG. 2, in accordance with embodiments of the present invention.

Referring now to FIG. 8, shown is a schematic block diagram of an example main control circuit of the control circuit of FIG. 2, in accordance with embodiments of the present invention. Main control circuit 24 can include logic signal generating circuit 241, and driving circuits 242 and 243. Logic signal generating circuit 241 can connect to output terminals of buck mode detection circuit 21, boost mode detection circuit 22, and buck-boost mode detection circuit 23 for receiving on time signal Ton, off time signal Toff, and reference time signal Tref. Logic signal generating circuit 241 can also receive valley value detection signal "Valley" and peak value detection signal "Peak."

Signals Valley and Peak can be generated by generating voltage compensation signal Vc by compensating a voltage feedback signal of stable output voltage Vout, and generating valley value detection signal Valley by comparing voltage compensation signal Vc against inductor current $I_L$. Peak value detection signal Peak can be generated by comparing voltage compensation signal Vc against inductor current $I_L$. Logic signal generating circuit 241 can generate pulse-width modulation (PWM) control signals PWM1 and PWM2 4 driving circuits 242 and 243. Driving circuit 242 can receive control signal PWM1 for controlling on/off states of switches K1 and K2, and driving circuit 243 can receive control signal PWM2 for controlling on/off states of switches K3 and K4. For example, when control signal PWM1 is high, switch K1 can be turned on and switch K2 can be turned off. Also, when control signal PWM1 is low, switch K1 can be turned off and switch K2 may be turned on. Also, when control signal PWM2 is low, switch K4 can be turned on and switch K3 can be turned off. Further, when control signal PWM2 is high, switch K4 can be turned off and switch K3 may be turned on.

An example operation processes of control of the four-switch buck-boost converter by control circuit 20 under buck, boost, and buck-boost modes to realize seamless switching between different modes as shown in FIGS. 5-8, will be described below in with reference to FIGS. 9-12.

Figure 9:
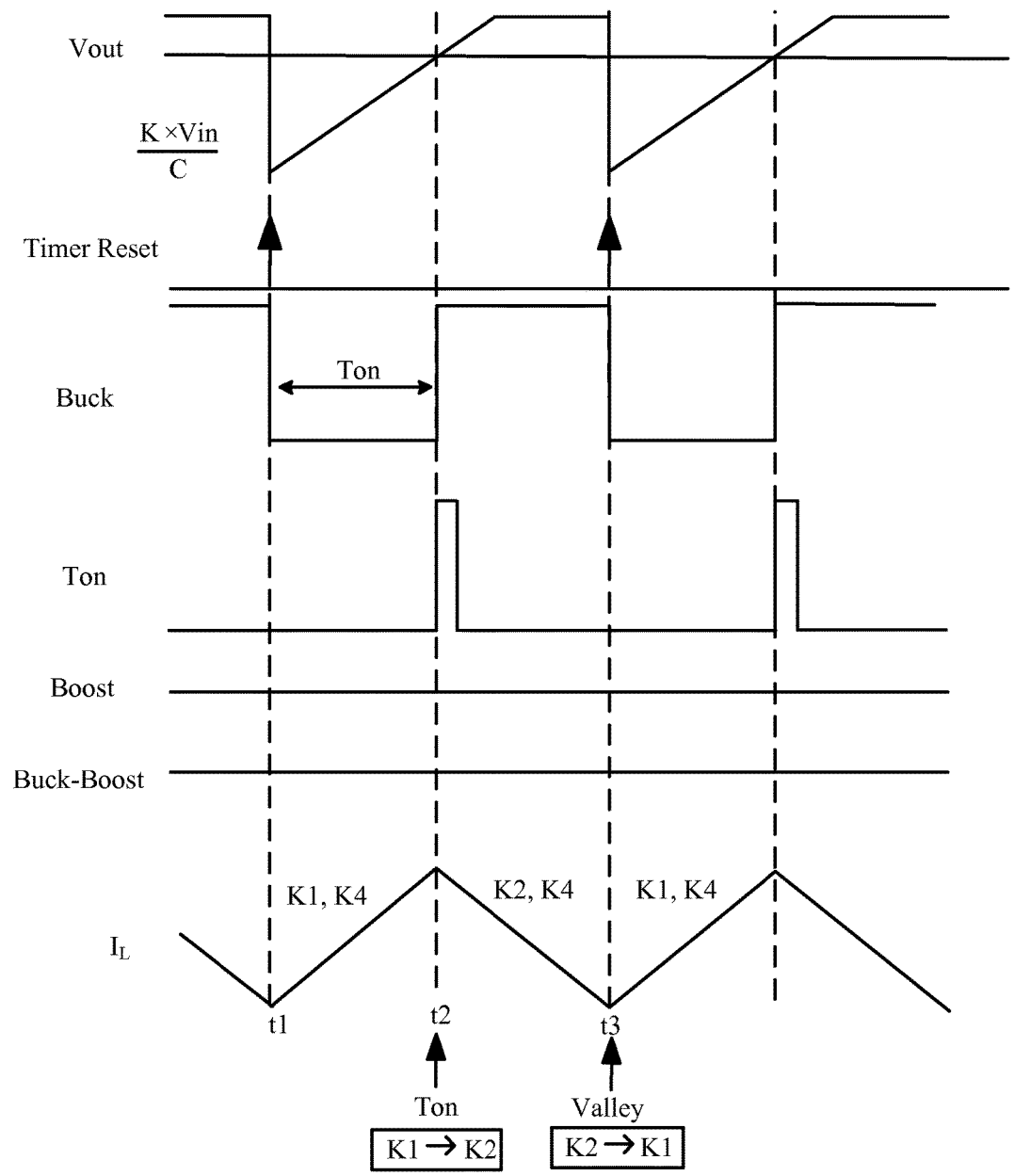
FIG. 9 is a waveform diagram of example operation of the four-switch buck-boost converter of FIG. 2 under a buck mode, in accordance with embodiments of the present invention.

Referring now to FIG. 9, shown is a waveform diagram of example operation of the four-switch buck-boost converter of FIG. 2 under a buck mode, in accordance with embodiments of the present invention. As shown in FIGS. 5, 8, and 9, at time t1, switches K1 and K4 are on, the timing reset signals of buck mode detection circuit 21, boost mode detection circuit 22, and buck-boost mode detection circuit 23 can turn off transistors Q1, Q2, and Q3. Thus, the mode detection circuits can be charged simultaneously until time t2, where the voltage $$\frac{V_{in} \times K}{C} \times T_{on}$$

across charging capacitor C1 reaches a level of Vout. At this time, the buck control signal can go high, and on time signal Ton can also go high. This indicates that the converter operates in a buck mode, where Ton in the formula represents the charging time of charging capacitor C1 (e.g., the on time of switch K1). Also, when on time signal Ton goes high, off time signal Toff and reference time signal Tref may both be low.

When a high level on time signal Ton is received by logic signal generating circuit 241, control signal PWM1 can go low as provided to driving circuit 242 to turn off switch K1 and turn on switch K2. In this case, inductor current $I_L$ of the four-switch buck-boost converter may be "freewheeling" by switches K2 and K4. From time t2 to time t3, inductor current $I_L$ can continue to decrease, and when inductor current $I_L$ reaches the predetermined valley value at time t3, valley value detection signal Valley can go high. Voltage compensation signal Vc may be configured as the preset valley value, and when a high level valley value detection signal is received by logic signal generating circuit 241, control signal PWM1 can go high as provided to driving circuit 242 to turn on switch K1 and turn off switch K2. An operation period may be completed when the four-switch buck-boost converter recovers to the state of switches K1 and K4 both being on. At this time, the timing reset signal(s) can reset the mode detection circuits to again determine the operation mode of the four-switch buck-boost converter.

Figure 10:
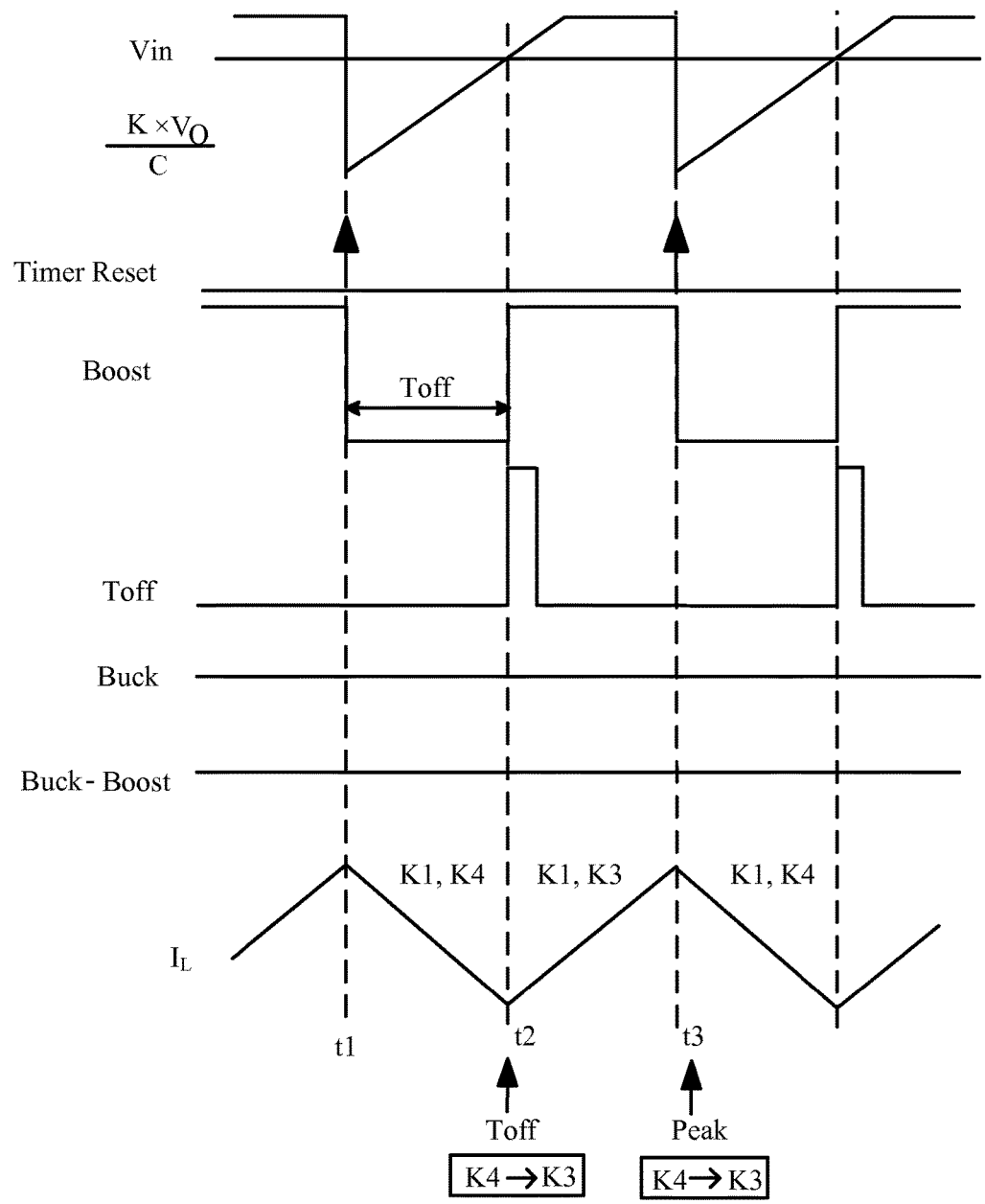
FIG. 10 is a waveform diagram of example operation of the four-switch buck-boost converter of FIG. 2 under a boost mode, in accordance with embodiments of the present invention.

Referring now to FIG. 10, shown is a waveform diagram of example operation of the four-switch buck-boost converter of FIG. 2 under a boost mode, in accordance with embodiments of the present invention. As shown in FIGS. 6, 8, and 10, at time t1, switches K1 and K4 are both on. Similar as in the buck mode, the three mode detection circuits may simultaneously be charged until time t2, the voltage $$\frac{V_o \times K}{C} \times T_{off}$$

across charging capacitor C1 reaches Vin. At this time, the boost control signal may go high, and off time signal Toff can also go high to indicate that the converter is operating in a boost mode. Toff in the formula may represent a charging time of charging capacitor C2 (e.g., the off time of switch K3). Similarly, when off time signal Toff goes high, on time signal Ton and reference time signal Tref may both be low. When a high level off time signal Toff is received by logic signal generating circuit 241, control signal PWM2 can go high as provided to driving circuit 243 to turn on switch K3 and turn off switch K4.

In this case, an input power supply may charge inductor L of the four-switch buck-boost converter, and the inductor current can continue to rise until time t3. When the inductor current reaches a predetermined peak value, peak value detection signal Peak can go high. Voltage compensation signal Vc can be configured as the predetermined peak value, and when a high level peak value detection signal is received by logic signal generating circuit 241, control signal PWM2 can go low as provided to driving circuit 243 to turn off switch K3 and turn on switch K4. The operation period may be completed when the four-switch buck-boost converter recovers to the state of switches K1 and K4 both being on. Also, the timing reset signals can be used to reset the mode detection circuits to again determine the operation mode of the four-switch buck-boost converter.

Figure 11:
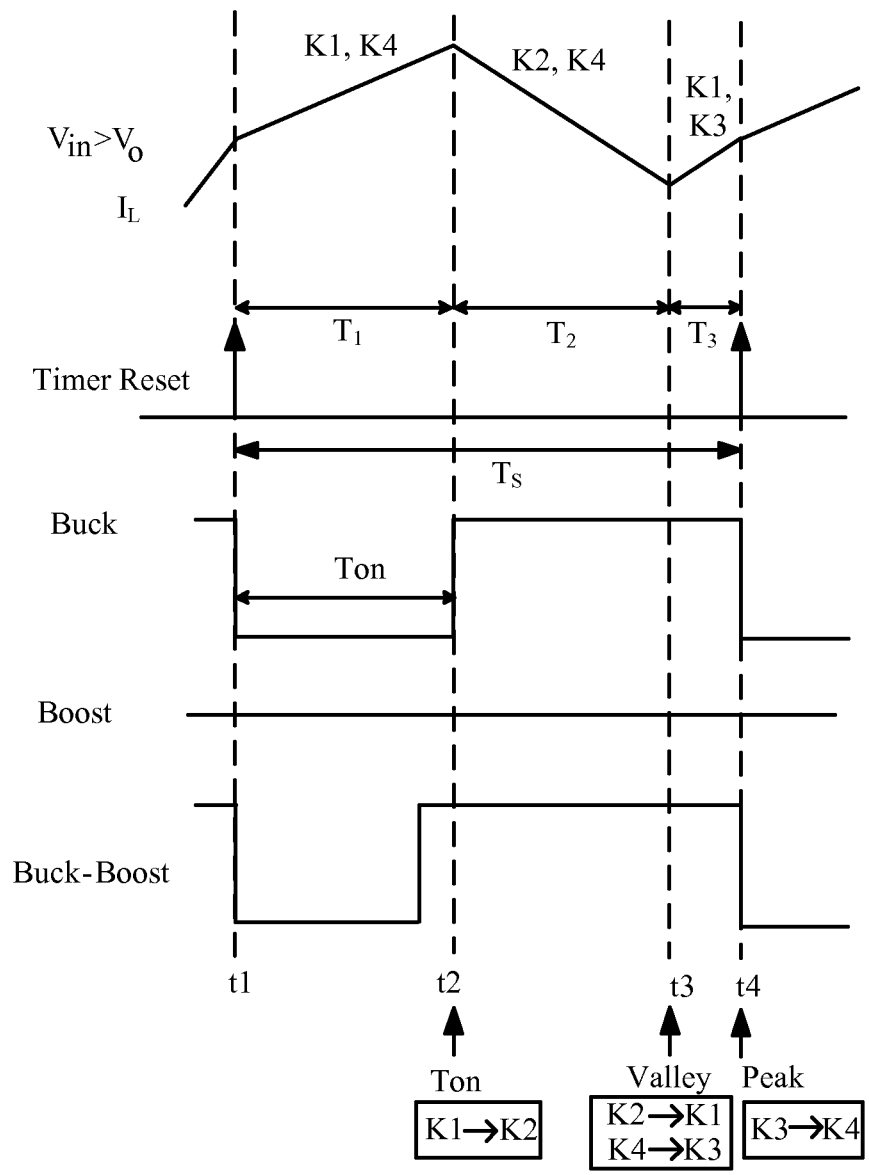
FIG. 11 is a waveform diagram of example operation of the four-switch buck-boost converter of FIG. 2 under a buck-boost mode, in accordance with embodiments of the present invention.

Referring now to FIG. 11, shown is a waveform diagram of example operation of the four-switch buck-boost converter of FIG. 2 under a buck-boost mode, in accordance with embodiments of the present invention. As shown in FIGS. 7, 8, and 11, when Vin is close to Vo (or Vout), such as Vin×Ka<Vout<Vin or Vin<Vout<Vin×Kb, Ka<1<Kb, the buck-boost control signal of buck-boost mode detection circuit 23 can go high to indicate that the circuit is operating in a buck-boost mode. When Vin×Ka<Vout<Vin, the circuit may be operating in mode 2, and its operation period can include three operation stages.

At time t1, switch K1 and switch K4 may both be on. During this operation stage, the input power supply can supply power to inductor L and the load, and the inductor current can continue to rise. Similar as in the buck mode, three mode detection circuits can be charged simultaneously, and when the voltage $$\frac{I_{ref}}{C} \times T_{ref}$$

across charging capacitor C3 reaches Vref, the buck-boost signal can go high. In this case, buck mode detection circuit 21 and boost mode detection circuit 22 can be enabled until time t2. When on time signal Ton of buck mode detection circuit 21 is reached, buck control signal can go high (e.g., Ton is high, and the boost control signal can be low). When high level are activated signals for reference time signal Tref and on time signal Ton are received by logic signal generating circuit 241, control signal PWM1 can go low as provided to driving circuit 242 to turn off switch K1 and turn on switch K2, to complete the first stage operation ed.

At time t2, switch K2 and switch K4 may be on, and inductor current $I_L$ of the four-switch buck-boost converter can be freewheeling by switches K2 and K4. The inductor current $I_L$ can continue to decrease, and when inductor current $I_L$ reaches the predetermined valley value, the valley value detection signal can go high. Voltage compensation signal Vc can be configured as the predetermined valley value, and when a high level or active valley value detection signal is received by logic signal generating circuit 241, control signal PWM1 can go high as provided to driving circuit 242 to turn on switch K1 and turn off switch K2. When a high level reference time signal Tref is received, control signal PWM2 can go high as provided to driving circuit 243 to turn on switch K3 and turn off switch K4. In this way, operation in the second stage may be completed, and switches K2 and K4 may be off, and switches K1 and K3 can be on.

After time t3, the input power supply can charge inductor L through switches K1 and K3, and inductor current $I_L$ can continue to rise. When the inductor current reaches the predetermined peak value, the peak value detection signal can go high. Voltage compensation signal Vc can be configured as the predetermined peak value, and when a high level or active peak value detection signal is received by logic signal generating circuit 241, control signal PWM2 can go low as provided to driving circuit 243 to turn off switch K3 and turn on switch K4. In this way, the operation of the third stage may be completed. An operation period can be completed when the four-switch buck-boost converter recovers to the state that switches K1 and K4 are both on. Also, the timing reset signals can be utilized to reset the three mode detection circuits in order to again determine the operation mode of the four-switch buck-boost converter.

Figure 12:
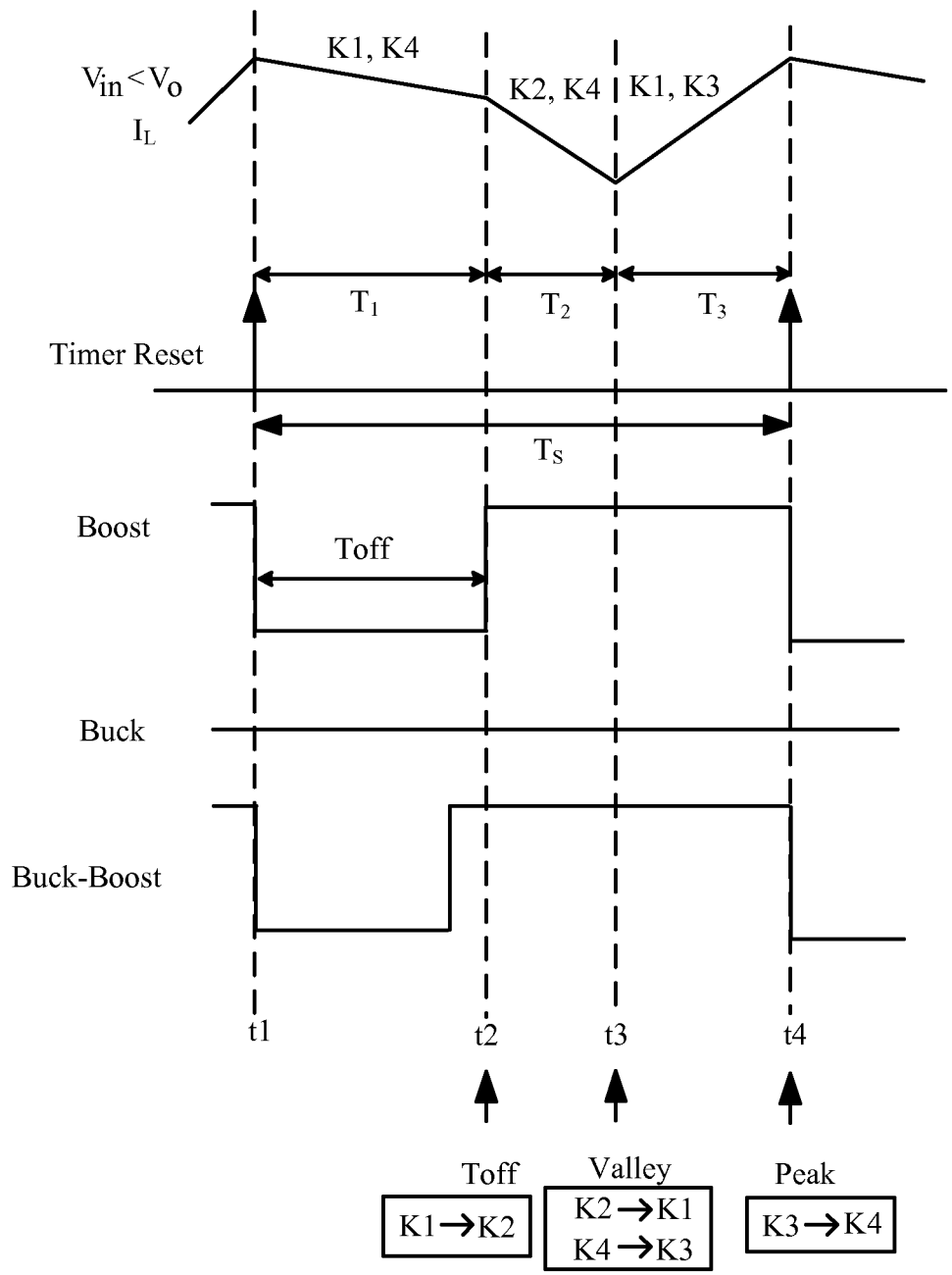
FIG. 12 is a waveform diagram of example operation of the four-switch buck-boost converter of FIG. 2 under a buck-boost mode, in accordance with embodiments of the present invention.

Referring now to FIG. 12, shown is a waveform diagram of example operation of the four-switch buck-boost converter of FIG. 2 under a buck-boost mode, in accordance with embodiments of the present invention. As shown in FIGS. 7, 8, and 12, when Vin is relatively close to Vout, the buck-boost control signal of the buck-boost mode detection circuit can go high, and the circuit can operate in a buck-boost mode. When Vin<Vout<Vin×Kb, the circuit can operate in mode 3, and its operation period can include three operation stages.

At time t1, switches K1 and K4 can both be on, and during this stage, the input power supply and the inductor supply power to the load, and the inductor current may decrease. Similar as in the buck mode, three mode detection circuits can be charged simultaneously, and when the voltage $$\frac{I_{ref}}{C} \times T_{ref}$$

across charging capacitor C3 reaches Vref, the buck-boost signal can go high. Buck mode detection circuit 21 and boost mode detection circuit 22 may be enabled until time t2. At this time, off time signal Toff of boost mode detection circuit 22 may be reached, and boost signal can go high (e.g., Toff is high, and the buck control signal can be low). When high levels on reference time signal Tref and off time signal Toff are received by logic signal generating circuit 241, control signal PWM1 can go low as provided to driving circuit 242 to turn off switch K1 and turn on switch K2. This can complete operation of the first stage.

At time t2, switches K2 and K4 may be on, and inductor current $I_L$ of the four-switch buck-boost converter can be freewheeling by switches K2 and K4. Inductor current $I_L$ can continue to decrease, until inductor current $I_L$ reaches the predetermined valley value. At this time, valley value detection signal Valley can go high, and voltage compensation signal Vc herein can be configured as the predetermined valley value. When a high level or activated valley value detection signal is received by logic signal generating circuit 241, control signal PWM1 can go high, and may be provided to driving circuit 242 to turn on switch K1 and turn off switch K2. When a high level reference time signal Tref is received, control signal PWM2 can go high, and may be provided to driving circuit 243 to turn on switch K3 and turn off switch K4. This can complete operation in the second stage, and switches K2 and K4 can be off, while switches K1 and K3 may be on.

After time t3, the input power supply can charge inductor L through switches K1 and K3, and inductor current $I_L$ can continue to rise. When the inductor current reaches the predetermined peak value, peak value detection signal Peak can go high. Voltage compensation signal Vc can be configured as the predetermined peak value. When a high level or activated peak value detection signal is received by logic signal generating circuit 241, control signal PWM2 can go low and may be provided to driving circuit 243 to turn off switch K3 and turn on switch K4. This can complete operation of the third stage. An operation period may be completed when the four-switch buck-boost converter recovers to the state that switches K1 and K4 are both on. Also, the timing reset signals can be utilized reset the mode detection circuits to again determine the operation mode of the four-switch buck-boost converter. As can be apparent from the description of the operation process of FIGS. 11 and 12, regardless of operating mode 2 or 3, the switches may be turned on in order as K1K4→K2K4→K1K3. By controlling the switches in this order, the availability and efficiency of the power supply can be improved.

In one embodiment, a method of controlling a converter having an inductor and first, second, third, and fourth switches, can include: (i) when the first and fourth switches are on, and the second and third switches are off, generating an on time signal according to an input voltage and a stable output voltage of the converter, where the first switch is coupled between the input voltage and a first terminal of the inductor, the second switch is coupled between the first terminal of the inductor and ground, the third switch is coupled between a second terminal of the inductor and ground, and the fourth switch is coupled between the second terminal of the inductor and the stable output voltage; (ii) generating an off time signal according to the input voltage and the stable output voltage of the converter; (iii) generating a reference time voltage according to a reference current signal and a reference voltage signal; (iv) turning off the first switch and turning on the second switch when the on time signal is activated to indicate that the converter is operating in a buck mode, where the first switch is turned on and the second switch is turned off when an inductor current reaches a predetermined valley value; (v) turning on the third switch and turning off the fourth switch when the off time signal is activated to indicate that the converter is operating in a boost mode, where the third switch is turned off and the fourth switch is turned on when the inductor current reaches a predetermined peak value; and (vi) turning off the first switch and turning on the second switch when the reference time signal is activated to indicate that the converter is operating in a buck-boost mode, where the first and third switches are turned on and the second and fourth switches are turned off when the inductor current reaches the predetermined valley value, and where the third switch is turned off and the fourth switch is turned on when the inductor current reaches the predetermined peak value.

Figure 13:
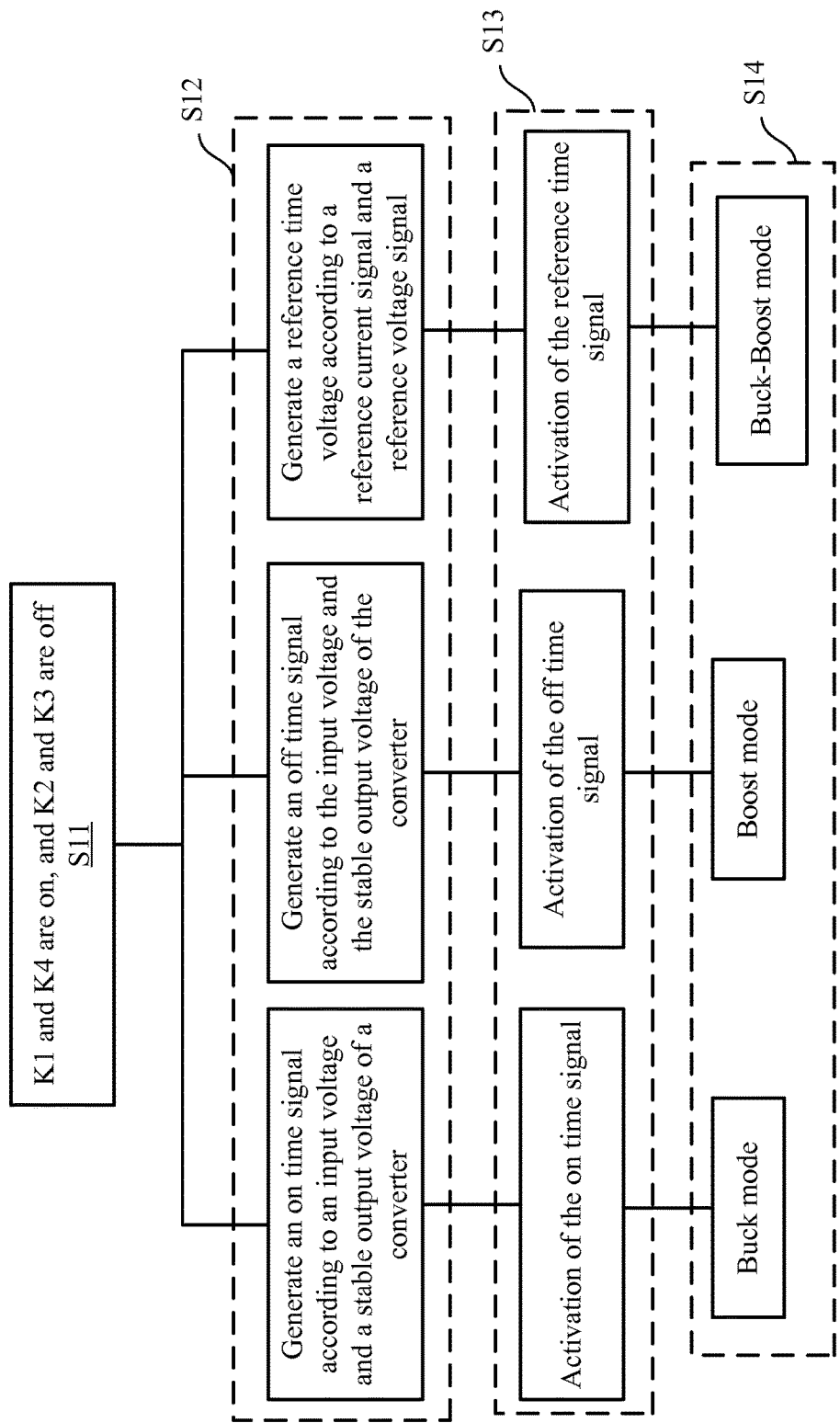
FIG. 13 is a flow diagram of an example control method for a four-switch buck-boost converter, in accordance with embodiments of the present invention.

Referring now to FIG. 13, shown is a flow diagram of an example control method for a four-switch buck-boost converter, in accordance with embodiments of the present invention. At S11, when switches K1 and K4 are on, switches K2 and K3 can be off, and the operation mode can begin to be detected. At S12, an on time signal can be generated according to the input voltage and the stable output voltage of the converter. Also, an off time signal can be generated according to the input voltage and the stable output voltage of the converter, such as substantially at the same time. Further, a reference time voltage can be generated according to a reference current signal and a reference voltage signal.

At S13, when the on time signal is activated (e.g., goes high), the four-switch buck-boost converter can operate in a buck mode. When the off time signal is activated (e.g., goes high), the four-switch buck-boost converter can be detected as operating in a boost mode. When the reference time signal is activated (e.g., goes high), the four-switch buck-boost converter can be detected as operating in a buck-boost mode. At S14, the converter can be detected as operating in a buck mode, boost mode, or buck-boost mode, in order to complete one operation period until switches K1 and K4 are turned on again. At this time, the flow can return to step S11.

Figure 14:
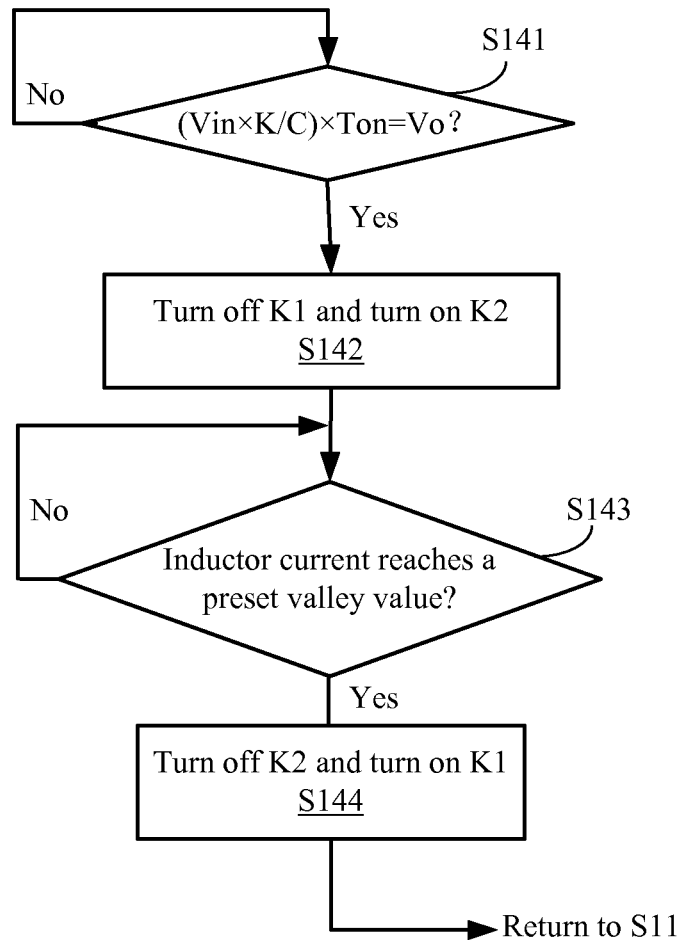
FIG. 14 is a flow diagram of an example control method of the four-switch buck-boost converter of FIG. 13 under the buck mode, in accordance with embodiments of the present invention.

Referring now to FIG. 14, shown is a flow diagram of an example control method of the four-switch buck-boost converter of FIG. 13 under the buck mode, in accordance with embodiments of the present invention. At S141, it can be detected as to whether $$\frac{V_{in} \times K}{C} \times T_{on}$$

reaches Vout by buck mode detection circuit 21. If so, the flow can proceed to step S142. Vin can be the input voltage, Vin×K (K is a preset ratio) is a current signal in proportion to input voltage Vin, Vout is the stable output voltage, and Ton is the on time of switch K1. At S142: switch K1 can be turned off, and switch K2 can be turned on. At S143, it can be determined as to whether an inductor current of the four-switch buck-boost converter is reduced to a predetermined valley value. If so, the flow can proceed to step S144. At S144, switch K2 can be turned off, and switch K1 can be turned on. With switches K1 and K4 both being on, the flow can return to step S11 of FIG. 13.

Figure 15:
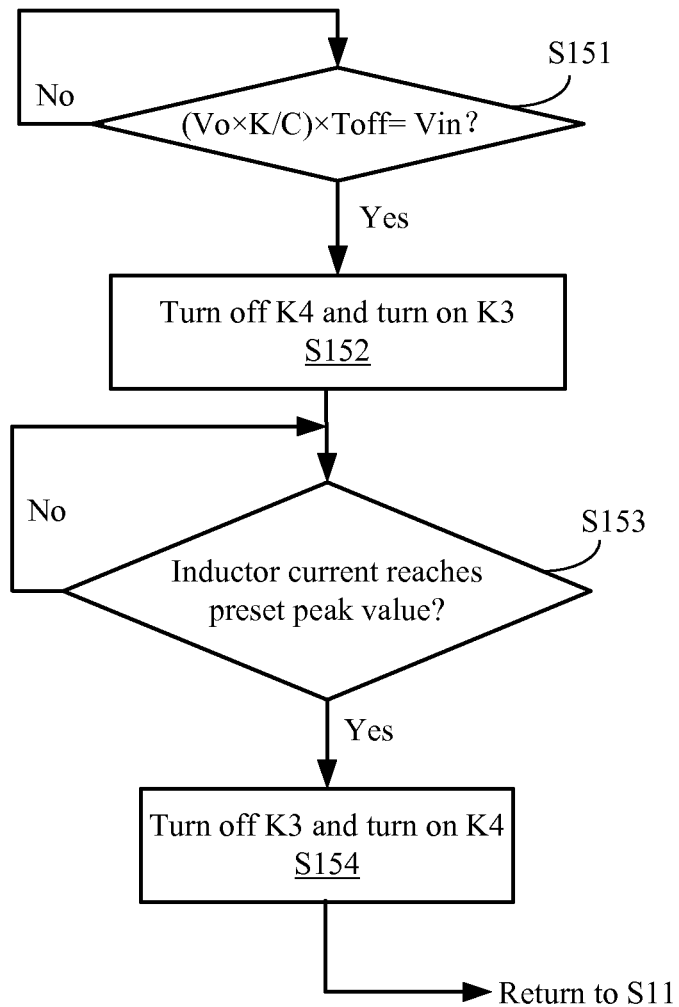
FIG. 15 is a flow diagram of an example control method of the four-switch buck-boost converter of FIG. 13 under the boost mode, in accordance with embodiments of the present invention.

Referring now to FIG. 15, shown is a flow diagram of an example control method of the four-switch buck-boost converter of FIG. 13 under the boost mode, in accordance with embodiments of the present invention. At S151, it can be detected as to whether $$\frac{V_o \times K}{C} \times T_{off}$$

reaches Vin by boost mode detection circuit 22. If so, the flow can proceed to step S152. For example, Vin is the input voltage, Vout is the stable output voltage, Vout×K is a current signal in proportion to stable output voltage Vout, and Toff is the off time of switch K3. At S152, switch K4 can be turned off, and switch K3 can be turned on. At S153, it can be determined as to whether an inductor current of the four-switch buck-boost converter has increased to a predetermined peak value. If so, the flow can proceed to step S154. At S154, switch K3 can be turned off, and switch K4 can be turned on. With switches K1 and K4 both being on, the flow can return to step S11 of FIG. 13.

Figure 16:
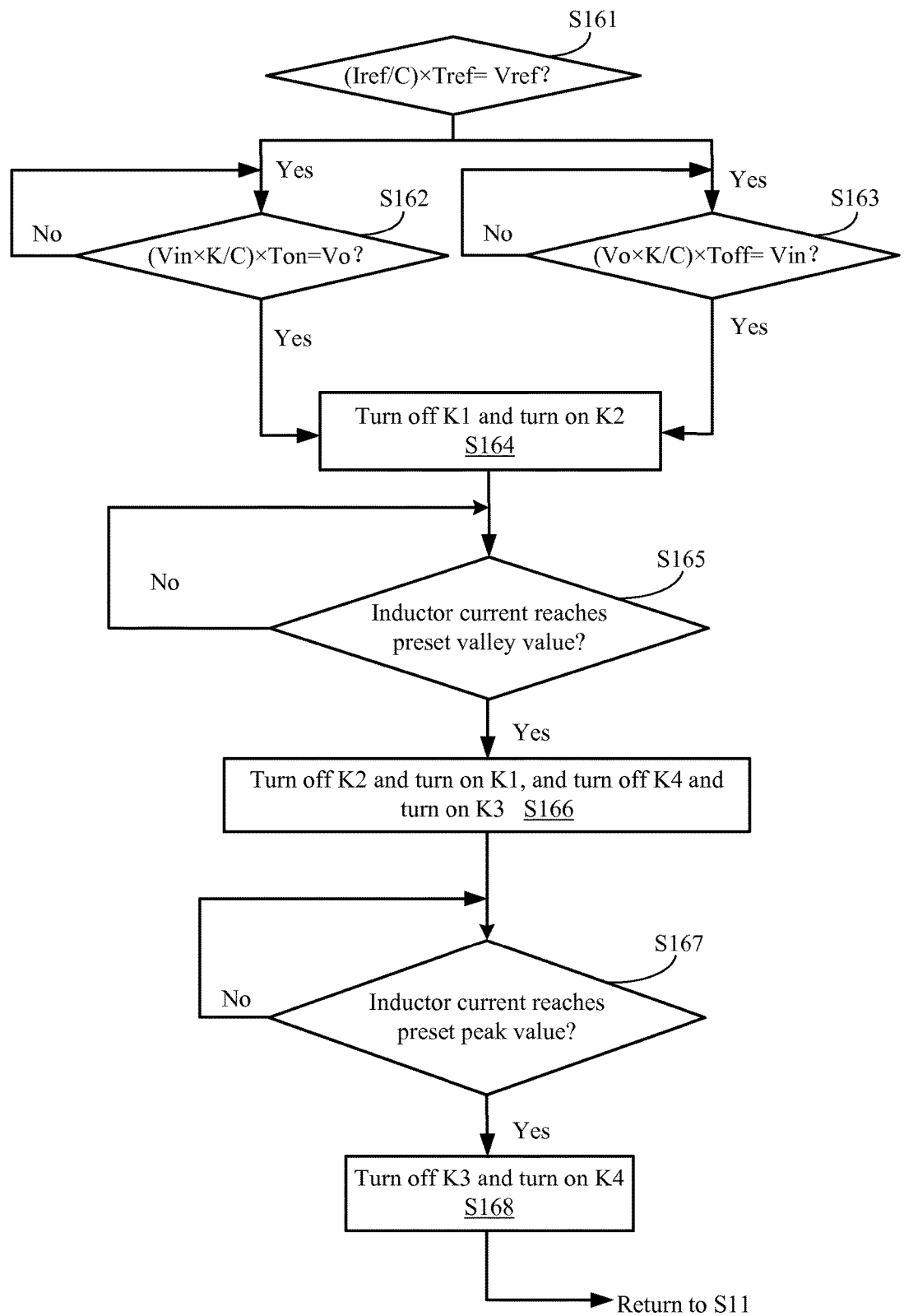
FIG. 16 is a flow diagram of an example control method of the four-switch buck-boost converter of FIG. 13 under the buck-boost mode, in accordance with embodiments of the present invention.

Referring now to FIG. 16, shown is a flow diagram of an example control method of the four-switch buck-boost converter of FIG. 13 under the buck-boost mode, in accordance with embodiments of the present invention. At S161, it can be detected as to whether $$\frac{I_{ref}}{C} \times T_{ref}$$

reaches Vref by buck-boost mode detection circuit 23. If so, the flow can proceed to S162 or S163. For example, Iref is the reference current signal, Vref is the reference voltage signal, and Tref is the reference time. Also, reference current signal Iref and reference voltage signal Vref may be determined according to converter operating periods. For example, in order guarantee that the reference time is less than the period of the converter, the reference time can be about 80% of the period.

At S162, it can be detected as to whether $$\frac{V_{in} \times K}{C} \times T_{on}$$

reaches Vout by buck mode detection circuit 21. If so, the flow can proceed to step S164. At S163, it can be detected as to whether $$\frac{V_o \times K}{C} \times T_{off}$$

reaches Vin by boost mode detection circuit 22. If so, the flow can proceed to step S164. At S164, switch K1 can be turned off, and switch K2 can be turned on. At S165, it can be determined as to whether an inductor current of the four-switch buck-boost converter is reduced to a predetermined valley value. If so, the flow can proceed to step S166. At S166, switch K2 can be turned off, and switch K1 can be turned on. Also, switch K4 can be turned off, and switch K3 can be turned on. At S167, a can be determined as to whether an inductor current of the four-switch buck-boost converter increases to a level of the predetermined peak value. If so, the flow can proceed to step S168. At S168, switch K3 can be turned off, and switch K4 can be turned on. With switches K1 and K4 both being on, the flow can return to step S11 of FIG. 13.

In summary, when switches K1 and K4 are on, and switches K2 and K3 are off, control methods and circuits of particular embodiments can be used to determine in which operation mode the four-switch buck-boost converter operates. In this way, substantially seamless switching between buck mode, boost mode, and buck-boost mode, can be accommodated, so as to reduce variation on the inductor current, to reduce number of the components, to reduce product cost, to simplify control process, to improve conversion efficiency, as well as other possible benefits relative to conventional approaches.

The embodiments were chosen and described in order to best explain the principles of the invention and its practical applications, to thereby enable others skilled in the art to best utilize the invention and various embodiments with modifications as are suited to the particular use contemplated. It is intended that the scope of the invention be defined by the claims appended hereto and their equivalents.

What is claimed is:

1. A method of controlling a converter having an inductor and first, second, third, and fourth switches, the method comprising:
   a) when said first and fourth switches are on, and said second and third switches are off, generating an on time signal according to an input voltage and a stable output voltage of said converter, wherein said first switch is coupled between said input voltage and a first terminal of said inductor, said second switch is coupled between said first terminal of said inductor and a ground, said third switch is coupled between a second terminal of said inductor and said ground, and said fourth switch is coupled between said second terminal of said inductor and said stable output voltage;
   b) generating an off time signal according to said input voltage and said stable output voltage of said converter;
   c) generating a reference time voltage by comparing a reference current signal as a voltage across a charging capacitor against a reference voltage signal;
   d) turning off said first switch and turning on said second switch when said on time signal is activated to indicate that said converter is operating in a buck mode, wherein said first switch is turned on and said second switch is turned off when an inductor current reaches a predetermined valley value;
   e) turning on said third switch and turning off said fourth switch when said off time signal is activated to indicate that said converter is operating in a boost mode, wherein said third switch is turned off and said fourth switch is turned on when said inductor current reaches a predetermined peak value; and
   f) turning off said first switch and turning on said second switch when said reference time signal is activated to indicate that said converter is operating in a buck-boost mode, wherein said first and third switches are turned on and said second and fourth switches are turned off when said inductor current reaches said predetermined valley value, and wherein said third switch is turned off and said fourth switch is turned on when said inductor current reaches said predetermined peak value.

2. The method of claim 1, further comprising:
   a) activating said on time signal when $$\frac{V_{in} \times K}{C} \times T_{on} = V_{out},$$

wherein $V_{in}$ comprises said input voltage, $V_{in} \times K$ comprises a current signal proportional to said input voltage $V_{in}$, $V_{out}$ comprises said stable output voltage, $T_{on}$ comprises an on time of said first switch, K comprises a predetermined ratio, and C comprises a predetermined capacitance value of a detection capacitor;
   b) activating said off time signal when $$\frac{V_{out} \times K}{C} \times T_{off} = V_{in},$$

wherein $T_{off}$ comprises an off time of said third switch, and $V_{out} \times K$ comprises a current signal proportional to said stable output voltage; and
   c) activating said reference time signal when $$\frac{I_{ref}}{C} \times T_{ref} = V_{ref},$$

wherein $I_{ref}$ comprises a reference current signal, $V_{ref}$ comprises a reference voltage signal, and $T_{ref}$ comprises a reference time.

3. The method of claim 2, further comprising:
   a) generating a voltage compensation signal according to a voltage feedback signal of said stable output voltage; and
   b) determining if said inductor current reaches at least one of said predetermined peak value and said predetermined valley value according to said voltage compensation signal.

4. A control circuit configured to control a converter having an inductor and first, second, third, and fourth switches, the control circuit comprising:
   a) a buck mode detection circuit configured to generate an on time signal according to an input voltage and a stable output voltage of said converter when said first and fourth switches are on, and said second and third switches are off, wherein said first switch is coupled between said input voltage and a first terminal of said inductor, said second switch is coupled between said first terminal of said inductor and a ground, said third switch is coupled between a second terminal of said inductor and said ground, and said fourth switch is coupled between said second terminal of said inductor and said stable output voltage;
   b) a boost mode detection circuit configured to generate an off time signal according to said input voltage and said stable output voltage of said converter;
   c) a buck-boost mode detection circuit configured to generate a reference time voltage by comparing a reference current signal as a voltage across a charging capacitor against a reference voltage signal;
   d) a main control circuit configured to turn off said first switch and turn on said second switch when said on time signal is activated to indicate that said converter is operating in a buck mode, wherein said first switch is turned on and said second switch is turned off when an inductor current reaches a predetermined valley value;
   e) said main control circuit being configured to turn on said third switch and to turn off said fourth switch when said off time signal is activated to indicate that said converter is operating in a boost mode, wherein said third switch is turned off and said fourth switch is turned on when said inductor current reaches a predetermined peak value; and
   f) said main control circuit being configured to turn off said first switch and to turn on said second switch when said reference time signal is activated to indicate that said converter is operating in a buck-boost mode, wherein said first and third switches are turned on and said second and fourth switches are turned off when said inductor current reaches said predetermined valley value, and wherein said third switch is turned off and said fourth switch is turned on when said inductor current reaches said predetermined peak value.

5. The control circuit of claim 4, wherein:
a) said on time signal is activated by said buck mode detection circuit when $$\frac{V_{in} \times K}{C} \times T_{on} = V_{out},$$

wherein $V_{in}$ comprises said input voltage, $V_{in} \times K$ comprises a current signal proportional to said input voltage $V_{in}$, $V_{out}$ comprises said stable output voltage, $T_{on}$ comprises an on time of said first switch, K comprises a predetermined ratio, and C comprises a predetermined capacitance value of a detection capacitor;
b) said off time signal is activated by said boost mode detection circuit when $$\frac{V_{out} \times K}{C} \times T_{off} = V_{in},$$

wherein $T_{off}$ comprises an off time of said third switch, and $V_{out} \times K$ comprises a current signal proportional to said stable output voltage; and
c) said reference time signal is activated by said buck-boost mode detection circuit when $$\frac{I_{ref}}{C} \times T_{ref} = V_{ref},$$

wherein $I_{ref}$ comprises a reference current signal, $V_{ref}$ comprises a reference voltage signal, and $T_{ref}$ comprises a reference time.

6. The control circuit of claim 5, wherein:
a) a voltage compensation signal is generated according to a voltage feedback signal of said stable output voltage; and
b) said inductor current is determined to have reached a level of at least one of said predetermined peak value and said predetermined valley value according to said voltage compensation signal.

* * * * *